(12) United States Patent
Klang et al.

(10) Patent No.: US 7,912,475 B2
(45) Date of Patent: Mar. 22, 2011

(54) DYNAMIC ALLOCATION OF RADIO RESOURCES

(75) Inventors: Göran Klang, Enskede (SE); Pål Frenger, Vällingby (SE); Stefan Parkvall, Stockholm (SE); Johan Nyström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 661 days.

(21) Appl. No.: 11/578,515

(22) PCT Filed: Mar. 29, 2005

(86) PCT No.: PCT/EP2005/051408
§ 371 (c)(1),
(2), (4) Date: Oct. 16, 2006

(87) PCT Pub. No.: WO2005/101882
PCT Pub. Date: Oct. 27, 2005

(65) Prior Publication Data
US 2007/0249361 A1  Oct. 25, 2007

(30) Foreign Application Priority Data

Apr. 19, 2004 (EP) .................................... 04101597

(51) Int. Cl.
*H04W 72/00* (2009.01)
(52) U.S. Cl. .................. 455/452.2; 455/450; 455/432.1; 455/436; 370/338; 370/395.41
(58) Field of Classification Search .................. 455/450, 455/452, 446, 447, 63.1, 423, 67.11, 434, 455/436, 455, 464, 509, 515, 452.2, 432.1; 370/437, 329, 341, 338, 395.41
See application file for complete search history.

(56) References Cited

U.S. PATENT DOCUMENTS 5,519,884 A  5/1996  Duque-Anton et al.
5,722,043 A  2/1998  Rappaport et al.
(Continued)

FOREIGN PATENT DOCUMENTS

JP  04-220822  8/1992
(Continued)

OTHER PUBLICATIONS

Russian Office Action (2 pages).
(Continued)

*Primary Examiner* — Nick Corsaro
*Assistant Examiner* — Quan M Hua
(74) *Attorney, Agent, or Firm* — Nixon & Vanderhye P.C.

(57) ABSTRACT

Radio resources are allocated to communication between a mobile station and a base station. The available set of radio resources may comprise radio resources primarily assigned to a neighboring cell if the 5 mobile station experience an instantaneous low level of co-channel interference from such neighboring cells. The existence of interference is preferably deduced from signal quality measurements of pilot signals. The allocation may concern uplink and/or downlink communication. Devices for performing the measurements are located in the mobile station, while devices for performing the evaluation, selection and actual allocation can be placed in different parts of the communications system—in the mobile station, in a base station or in a core network node, or as a distributed means.

24 Claims, 7 Drawing Sheets

U.S. PATENT DOCUMENTS

| | | | |
|---|---|---|---|
| 5,854,981 A * | 12/1998 | Wallstedt et al. | 455/439 |
| 5,867,478 A | 2/1999 | Baum et al. | |
| 6,055,427 A * | 4/2000 | Ojaniemi | 455/436 |
| 6,154,655 A | 11/2000 | Borst et al. | |
| 6,498,934 B1 | 12/2002 | Muller et al. | |
| 6,522,888 B1 | 2/2003 | Garceran et al. | |
| 6,549,782 B2 * | 4/2003 | Roy | 455/450 |
| 6,636,736 B1 | 10/2003 | Billon et al. | |
| 6,895,244 B2 * | 5/2005 | Iyer | 455/424 |
| 2002/0145988 A1 | 10/2002 | Dahlman et al. | |
| 2003/0013451 A1 | 1/2003 | Walton | |
| 2004/0018843 A1 * | 1/2004 | Cerwall et al. | 455/450 |

FOREIGN PATENT DOCUMENTS

| | | |
|---|---|---|
| JP | 10-056671 | 2/1998 |
| JP | 2002-540689 | 11/2002 |

OTHER PUBLICATIONS

Chinese Office Action dated May 27, 2010 (5 pages).

English translation of Japanese Notice of Grounds for Rejection mailed Jul. 16, 2010 (2 pages).

* cited by examiner

DYNAMIC ALLOCATION OF RADIO RESOURCES

This application is the US national phase of international application PCT/EP2005/051408, filed on 29 Mar. 2005, which designated the U.S. and claims priority of EP 04101597.5, filed 19 Apr. 2004, the entire contents of each of which are hereby incorporated by reference.

TECHNICAL FIELD

The technical field of the present disclosure relates in general to allocation of radio resources in mobile communications systems.

BACKGROUND

The radio spectrum assigned to a mobile communications system must in general be reused within different geographical sub-areas, so called cells, in order to provide both coverage and capacity. Depending on technology choices and factors such as what multiple access techniques that is employed and how robust to interference the mobile and base station receivers are, the so called reuse distance between different cells using the same portion of spectrum may however vary. This variation appears, not only between different types of systems, but also within the same system. The latter is due to e.g. the topology of the service area.

In practice, to model the cellular layout of a mobile communications system a heterogeneous grid of regular hexagons is often used. Although not providing a true description of the real cell and its coverage area, as an approximation, hexagons have proven useful for cell planning purposes as they provide a convenient framework in which a wide range of tessellating cell-reuse clusters can be defined to describe the distribution of the available spectrum/channel resources over the total service area of a given system.

It is known that tessellating clusters of size N can be constructed if $$N=i^2+ij+j^2,$$

where i and j are non-negative integers and $i \geq j$. From the relation above, it follows that the allowable cluster sizes are N=1, 3, 4, 7, 9, 12, . . .

Clearly, to optimise the spectrum efficiency of a given system, it is desirable to use as small cluster reuse factor as possible. However, unless spread spectrum or space division multiplexing techniques are used, employing small reuse factors may not be possible since the impact of co-channel interference from neighbouring cells may become too severe. That is, the impact of co-channel interference may potentially wreck the ability of the receivers in the different cells to demodulate and recover their intended data meeting quality of service expectations. To circumvent this problem and to gain control over the emission and impact of co-channel interference reuse factors larger than one are typically used in many systems in real life.

Employing a fixed reuse factor larger than one automatically implies that only a portion of the available system bandwidth is offered to any mobile station in a given cell. This is clearly, both from a network point-of-view as well as from a user perspective, non-advantageous for many reasons. A small selection of such reasons are:

The maximum peak throughput rate is reduced.
The mobile station exposure to co-channel interference increases as the transmission time increases. Hence, the probability that base stations in nearby cells simultaneously transmits packets to different users using the same channel resources increases.
Base station emission period of interference into neighbouring cells increases.
The accessibility of the channel resource is reduced. Serving many mobile stations, the delay in the base station may become substantial. This will be due to both the actual transmission time but also to the time required for retransmissions.
Linked to the reduced peak data rate and the deteriorated channel accessibility is also the risk that the user perception of the air-interface as being slow may increase.

One example of frequency planning is disclosed in the U.S. Pat. No. 6,498,934. Enhanced path-loss estimates are here used for assigning channels to different base stations. The path-loss estimates are obtained by instructing mobile stations being connected to the system to measure certain neighbouring cell signals and to lock the mobile stations power to enable synchronized measurements in neighbouring base stations. From these measurements, statistics on path-loss estimates are calculated, which in turn are used for improving the frequency planning.

In the published US patent application 2003/0013451 A1, a method is disclosed, where the reuse plan for the cells of a communications system is dynamically redefined. Based on a number of factors, such as the observed interference levels, loading conditions, system requirements etc, the reuse plan for the division of resources to the different cells can be adapted. The publication also discloses methods for efficient allocation of resources within the available set of resources for each cell.

A problem with the reuse plan adaptation presented in US 2003/0013451 A1 is that the entire communications system has to involved in the adaptation. Resources that are influenced by the adaptation have to be unused and system configuration data has to be updated throughout the entire system before the new reuse plan can be utilised. This problem makes it less advantageous to use the adaptation ideas, at least for adapting to short-term changes in the communications system.

SUMMARY

A general problem with prior-art resource allocation is that the radio resources can not be efficiently utilised in the view of the actual interference situation as experienced by a mobile station at a specific location and at a specific time.

In a non-limiting aspect, resource allocation devices and methods are provided for improving the radio resource utilisation efficiency. In another non-limiting aspect, local and present signal quality are utilized to improve the radio resource utilisation efficiency. In a further non-limiting aspect, allocation adaptation on very short terms is allowed.

In general, radio resources are allocated to communication between a mobile station and a base station. The available set of radio resources may comprise radio resources primarily assigned to a neighbouring cell if the mobile station experience an instantaneous low level of co-channel interference from such neighbouring cells. The presence of co-channel interference is preferably deduced from signal quality measurements of pilot signals. The allocation may concern uplink and/or downlink communication. Devices for performing the measurements can be located in the mobile station, while devices for performing the evaluation, selection and actual allocation can be placed in different parts of the communications system—in the mobile station, in a base station or in a core network node, or as distributed means.

An advantage is that the overall radio resource utilisation may be increased. Furthermore, fluctuations of resource demands on short-term time-scales can be handled efficiently.

BRIEF DESCRIPTION OF THE DRAWINGS

The invention, together with further objects and advantages thereof, may best be understood by making reference to the following description taken together with the accompanying drawings, in which.

DETAILED DESCRIPTION

A fundamental reason for considering reuse larger than one is that it provides means for controlling the impact of co-channel interference (CCI).

Since mobile stations at the rim of cells are the ones theoretically most likely to be exposed to CCI, the idea of using a reuse factor larger than one is thus to, at least to some degree, guarantee throughput in all positions of all cells. This is of course highly desirable from a network point-of-view since most mobile stations can be served. However, the approach is conservative. In some positions of a cell, for example, in the area close to the base station but potentially also in other sub-areas, the interference situation may be such that a larger portion of the spectrum could be used without causing strong co-channel interference in other neighbouring cells. That is, if only mobile stations were present in such areas, a smaller reuse factor could be used. This observation can be advantageously used as described in the present disclosure. The actual interference situation in the part of the cell where a mobile station is present may permit traffic to be conducted using a larger portion of the system bandwidth than was originally granted by the reuse scheme primarily applied.

Figure 1:
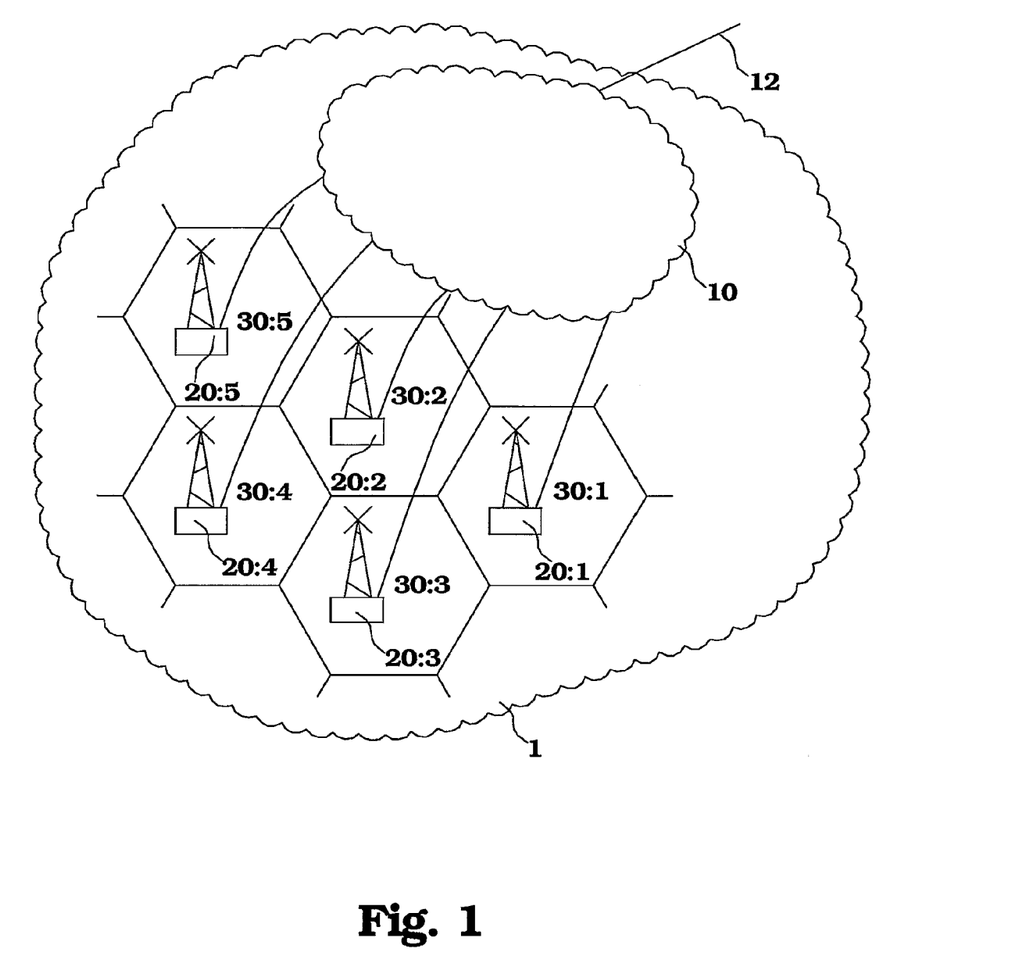
FIG. 1 is a schematic illustration of a cellular communications system.

In order to illustrate this basic idea, a general mobile communications network will first be discussed. In FIG. 1, a mobile communications network 1 comprises a core network 10. The core network 10 is in turn connected 12 to external networks. A number of base stations 20:1-20:5 are connected to the core network 10. Each base station 20:1-20:5 is responsible for covering a certain respective geographical area or cell 30:1-30:5. In the present disclosure, the cells 30:1-30:5 are, as a matter of illustrative convenience, represented by hexagons. A mobile station being situated within a certain cell will typically be connected to the communications network via a radio link to the corresponding base station 20:1-20:5.

Figure 2A:
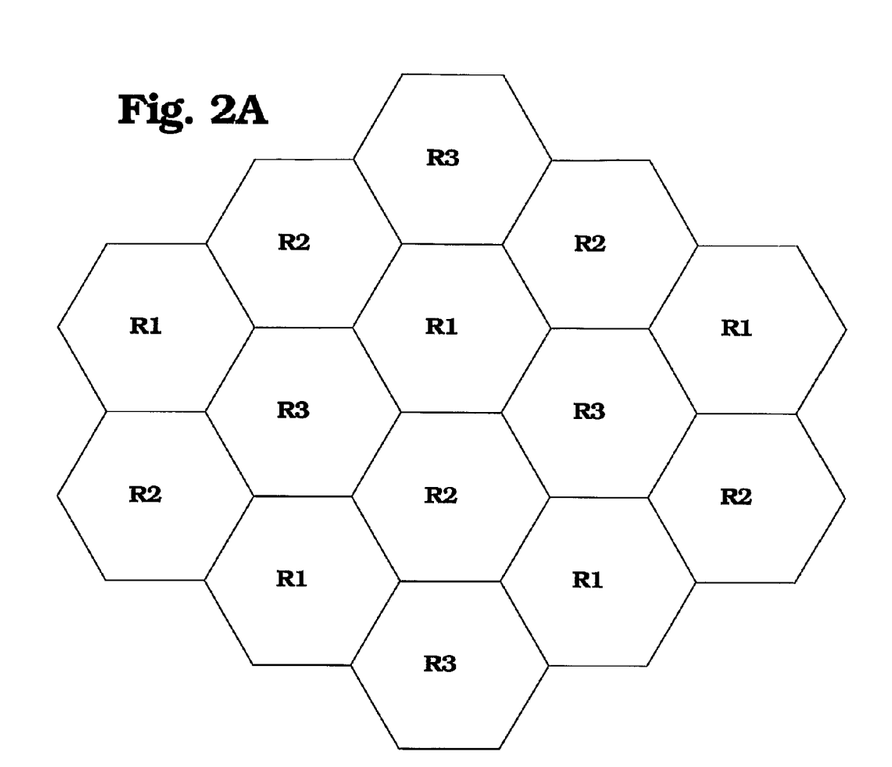
FIG. 2A is a schematic illustration of reuse of radio resources in a cellular communications system.

A mobile station being situated at the outer part of a cell will experience signals having relatively high powers also from adjacent cells. In order to counteract interference between the different cells, only a part of the totally the available radio resources is in a typical case used in each cell. In a commonly used manner, the available resources are divided into a number of groups, and each cell has the opportunity to use radio resources within one such group. This is the basic idea of resource reuse. One typical example is illustrated in FIG. 2A. Here, the radio resources are divided into three parts, R1, R2, R3, and each cell is allowed to use one of these sets of radio resources. In the illustrated example, the so-called reuse factor is 3. One can immediately notice that the same radio resources are not used in any adjacent cells, but are used in cells further away.

Figure 2B:
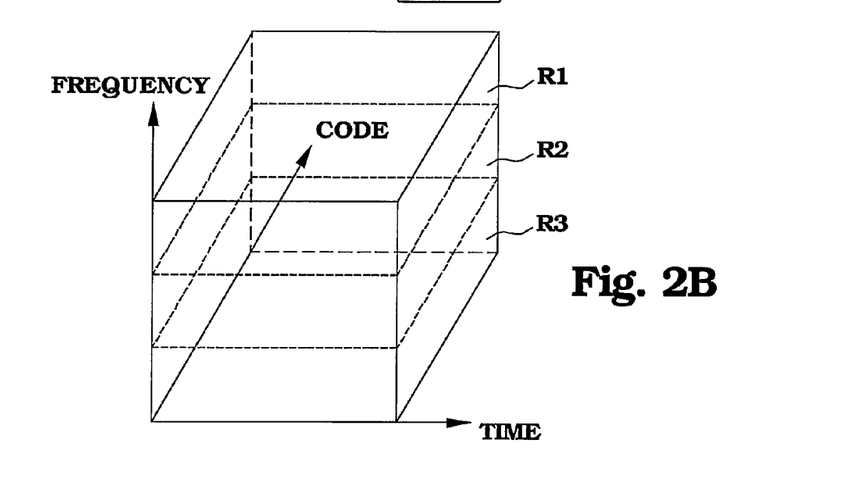
FIG. 2B is a diagram illustrating division of radio resource space into subsets.

FIG. 2B illustrates a volume of the radio resource space. In this illustration, the radio resource space is spanned by the quantities time, frequency and code. Depending on the actual radio techniques used, the totally available radio resource space is divided into smaller volumes, which are allocated for communication, uplink or downlink, between a base station and a mobile station. When a reuse plan is applied, the totally available radio resource space is divided in a number of part volumes. In FIG. 2B, the totally available radio resource space is divided into three parts, R1, R2 and R3, which e.g. could be used as illustrated in FIG. 2A. The division in FIG. 2B is made in the frequency dimension, i.e. the radio resources assigned to each cell is defined by a number of frequencies. However, the definition of the part resource spaces can be made in any manner, in time dimension, in code dimension or in any combination thereof. The resource space can also be extended into more dimensions, such as the spatial domain.

Figure 3:
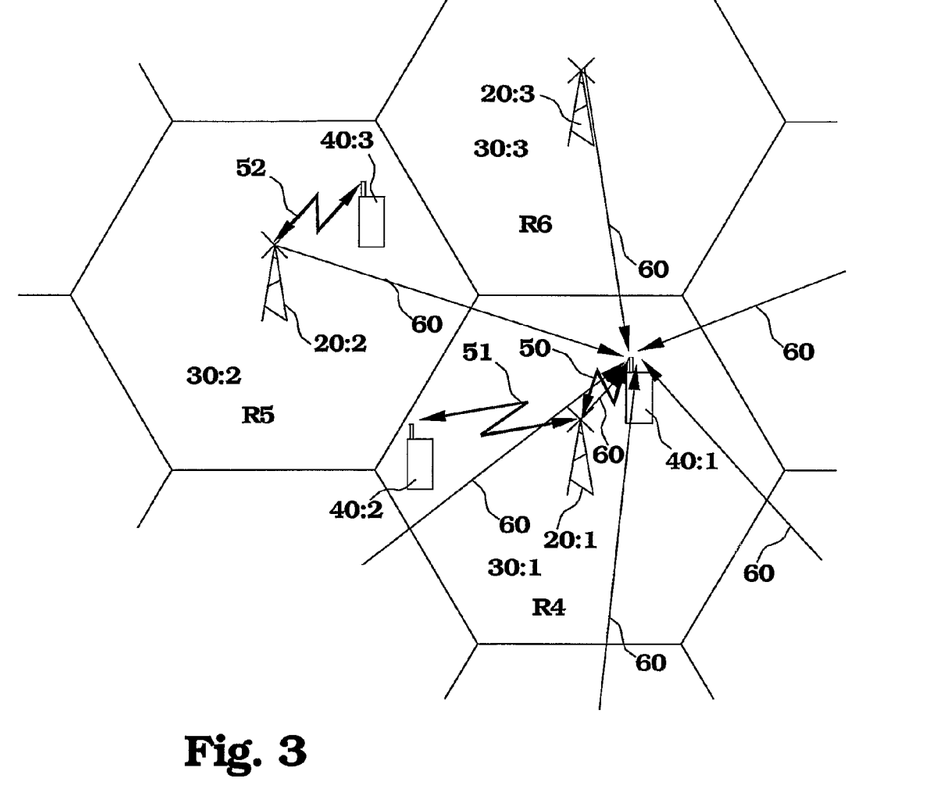
FIG. 3 is a schematic illustration of a non-limiting embodiment of a cellular communications system.

FIG. 3 illustrates an embodiment of a mobile communications system. A number of base stations 20:1-3 of which only three have reference numbers, are associated with a respective cell 30:1-3. A set of radio resources R4 is primarily assigned to base station 20:1, a set of radio resources R5 is primarily assigned to base station 20:2, and a set of radio resources R6 is primarily assigned to base station 20:3. R4, R5 and R6 are typically exclusive in relation to each other within expected interference distance, i.e. comprise no common resources if they are likely to give rise to co-channel interference. However, sets of radio resources further away from each other may comprise common resources, i.e. the sets are typically non-exclusive when seen on a larger scale. The sets of radio resources are typically assigned according to a reuse plan, but may also be decided in other ways.

Three mobile stations 40:1-3 are illustrated to be present within the coverage of cells 30:1 and 30:2. The mobile station 40:1 is situated close to its own base station 20:1 and communicates with the base station 20:1 by radio resources 50. The mobile station 40:2 is situated within cell 30:1, but relatively close to the border to cell 30:2 and communicates with the base station 20:1 by radio resources 51. The mobile station 40:3 is situated within cell 30:2, but relatively close to cell 30:3, and communicates with the base station 20:2 by radio resources 52.

The mobile station 40:1 experiences in general a lot of radio signals 60 from different base stations within the communications system. The strongest signals are probably the ones from the own base station 20:1, but normally, also signals from the closest other base stations are possible to detect. For the mobile station 40:1, being situated close to its own base station 20:1, the signals from the own base station 20:1 are probably much stronger than the second strongest signals, in this example probably the signals from base station 20:3. However, for the mobile station 40:2, the signal strengths from the base stations 20:1 and 20:2 will probably not differ very much. In this situation, the mobile station 40:2 typically is more exposed to co-channel interference than the mobile station 40:1. The assignment of radio resources is therefore typically made considering the worst case, e.g. the mobile station 40:2. However, for the mobile station 40:1, a higher utilisation of the radio resources could be of interest.

According to an embodiment, a base station is allowed to allocate also radio resources that are not primarily assigned to the base station for use in the entire cell. In certain cases, i.e. for certain mobile stations situated at certain locations or having certain interference situations, radio resources assigned to neighbouring cells can also be utilised. In other words, with variable resource allocation according to the present invention, mobile stations can in some situations "borrow" spectrum from other cells. The condition for this is that the co-channel interference situation allows so. This is valid in both uplink and downlink situations.

According to an embodiment of the present invention, a base station is allowed to allocate also radio resources that are not primarily assigned to the base station for use in the entire cell. In certain cases, i.e. for certain mobile stations situated at certain locations or having certain interference situations, radio resources assigned to neighbouring cells can also be utilised. In other words, with variable resource allocation according to the present invention, mobile stations can in some situations "borrow" spectrum from other cells. The condition for this is that the co-channel interference situation allows so. This is valid in both uplink and downlink situations.

In the uplink scenario, and with reference to FIG. 3, mobile stations are in general allowed to utilise the radio resources R4-R6 assigned to a certain cell. Mobile station 40:1 and 40:2 can e.g. communicate with base station 20:1 using radio resources within R4, while mobile station 40:3 communicates with base station 20:2 using radio resources from R5.

However, mobile station 40:1, which is located close to base station 20:1 and far from e.g. base station 20:2 (in the radio sense) may also transmit using radio resources from R5. The reason for this is that the co-channel interference created at base station 20:2 is quite small due to the large distance and the fact that mobile station 40:1 probably sends at low power. The mobile station 40:2, on the other hand, cannot use radio resources from R5, as this may result in significant interference at base station 20:2 and corrupt the possibility for terminals in the corresponding cell 30:2 to transmit to base station 20:2.

In the downlink scenario, the situation is similar. To ensure good performance for mobile station 40:2, downlink transmission from base station 20:1 to mobile station 40:2 is only using the resources of R4. However, for the mobile station 40:1, the situation is somewhat different as it is located far from other base stations than base station 20:1. Hence, transmission to mobile station 40:1 from base station 20:1 may use also resources from R5 and R6 (provided that the mobile station 40:1 reports a sufficiently low interference level on frequencies other than within R4).

In order for the base station to decide whether a higher utilisation of radio resources than primarily assigned may be considered or not when serving a specific mobile station, the base station needs to know the interference situation at the mobile station location when the packet is to actually be transmitted. In a general case, the mobile station measures quality measures of signals transmitted from a multitude of base stations. From these quality measures, an evaluation is made concluding which base stations of the multitude of base stations that do not risk causing any significant co-channel interference. In other words, base stations outside and inside, respectively, a co-channel interference distance or area relative to the first mobile station are determined. Radio resources only used by non-interfering base stations can then be candidates for allocation of communications to and/or from the mobile station in question.

It is here important to notice that the set of allowed or available radio resources to select between is unique for each mobile terminal and for each situation. The assignments of radio resources for general use by the different base stations need not be altered. Instead, the rules for allowing utilisation of resources outside the primarily assigned resources can be modified to allow for using resources primarily assigned to neighbouring cells at certain interference situations. In this way, there is no need for a general adaptation of the entire division of the resource space over the entire communications system coverage area. The use or "borrowing" of spectrum is made on a temporary basis, connected to a specific mobile station at a specific situation. The time-scale of the adaptation can be very fast and may even vary between one burst and the next. Furthermore, no notifications have to be spread over the rest of the communications system.

In most communications systems, packet data transmissions are typically by nature bursty. This poses a potential problem, since the mobile station may not be able to establish an accurate interference situation estimate based on the actual interference seen at a certain time instant or period in data signals, that is valid at the time of the base station's actual transmission. In one embodiment, typically in an Orthogonal Frequency Division Multiplexing (OFDM) based system, the individual mobile stations measure observed pilot powers. Pilot tones or more general pilot signals are transmitted on different sub-carriers or sub-carrier groups from different cells with different reuse cluster identification numbers. The measured pilot signal powers for the different reuse cluster groups are preferably reported before a package is to be sent from the base station to the mobile station. That is, the spectrum allocation is preferably decided based on the received pilot powers and not the actual data traffic. This approach is advantageous since, in contrast to packet data traffic, the transmission of pilot information from the different cells is continuous in time.

If the power of the pilot carriers transmitted in all cells defines the cells, i.e. no other carrier in a given cell is transmitted with a higher power than the pilot carriers, the pilot power measurement report from a mobile station will provide its serving base station with two important pieces of information. Worst-case estimates of the interference levels that can be expected in the neighbouring radio resource spaces, i.e. in all other resources than the ones primarily assigned by the reuse scheme. Note that the actual interference situation most likely is better. Furthermore, it also provides an avenue for estimating the absolute path loss from the base station to the mobile station by comparing the reported received signal power in the allocated frequency band with the known transmitted power. Since the transmission of pilots in all cells is continuous, the obtained interference estimates will be conservative. However, of the same reason making them conservative, they will also be quasi-stationary thus making them valid at the transmission time of the packet if the measurement is requested by the base station sufficiently close in time to the actual transmission time.

Thus, given a measurement report from a mobile station, the base station can based on the estimated path loss and some predefined signal-to-interference ratio (SIR) target calculate what transmission powers that are needed in each sub-band in order to convey data to the mobile station with some predefined quality-of-service. If these calculated power levels can be accepted, i.e. they are lower than some maximum values ultimately determined by some network control algorithm or set to some fixed levels proportional to the maximum allowed power in the primarily allocated resources, the base station can decide whether the individual resources can be used or not for data transfer. Finally, depending on the size of the packet to be conveyed and the number of resources that can theoretically be allocated for a given mobile station, the base station can inform the mobile station using for example some logical control channel what resources to consider in the next packet transmission.

The interference estimates transmitted from the mobiles to the network can also be used to determine the allowed radio resources for a specific mobile in the uplink. If the mobile reports a low power level on downlink frequencies other than its own, e.g. with reference to FIG. 3, mobile station 40:1 is reporting a low interference level on downlink resources of R5, it is likely that the mobile is close to its own base station and the network can decide to let the mobile communicate on multiple resources in the uplink, i.e. borrow resources from neighbouring cells. The mobile could also autonomously decide on the bandwidth to use in the uplink transmission based on downlink measurements, although it is preferable to involve the network in the decision process. Activity indicators transmitted from the base stations to the terminals could also be used to decide on the instantaneous uplink radio resource use. If base stations in the neighbourhood all report low traffic intensity in their resources, terminals in neighbouring cells could borrow these resources for uplink transmission.

Although the present disclosure basically involves the context for frequency reuse and OFDM systems, the use of the invention is not limited to this case. Other transmission technologies, e.g. CDMA, and reuse in other dimensions than frequency is possible.

Figure 4A:
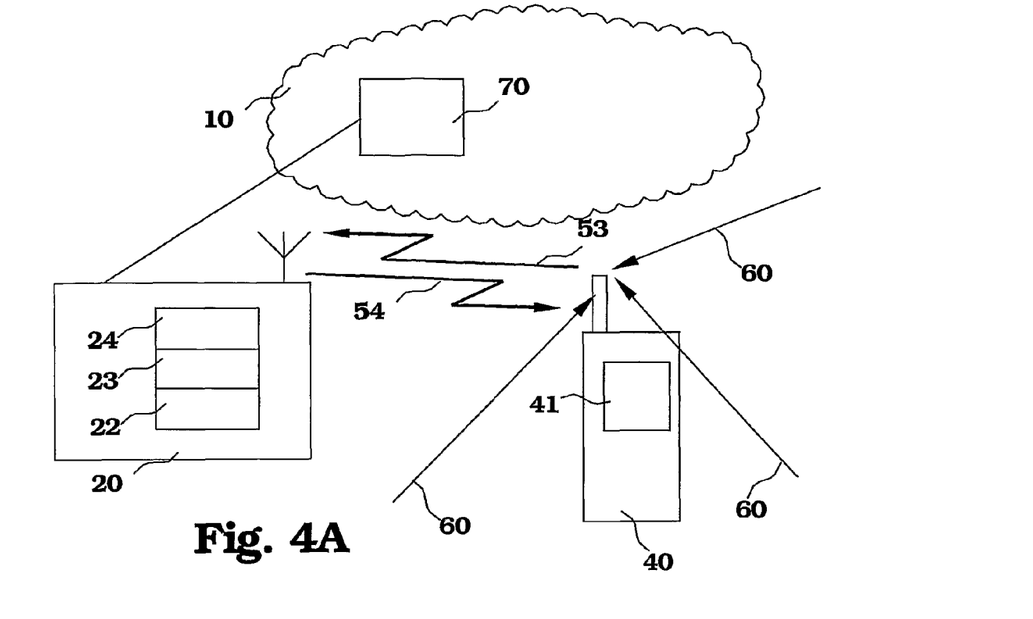
FIG. 4A is a block diagram of non-limiting embodiments of a base station and a mobile station.

FIG. 4A illustrates an embodiment of a communications system having a mobile station 40 and a base station 20 operating together. The base station 20 is further connected to a core network 10 and nodes 70 therein. The mobile station 40 receives a number of signals 60 from surrounding base stations. As mentioned above, the signals 60 are preferably pilot signals, but other signals, e.g. containing user data, can also be utilised. The mobile station 40 comprises means 41 for measuring a quality measure of the signals 54, 60. This quality measure may be based on the signal powers, resulting in e.g. a path loss measure, a channel gain measure or different kinds of interference measures. The measurements are compiled and transmitted 53 to the base station 20 in a measurement report.

The base station 20 receives the measurement report. The base station 20 comprises in this embodiment evaluation means 22 for evaluating the quality measures associated with the different base stations. More precisely, the evaluation means 22 determines which of the base stations that pose potential co-channel interference problems. In other words, it is determined if the different base stations are inside or outside co-channel interference distance relative to the mobile station 40. The co-channel interference distance being defined e.g. by a C/I threshold ratio. The base station 20 further comprises selection means 23 for obtaining a set of radio resources that the mobile station 40 could be allowed to use. This available set of resources can of course comprise the radio resources primarily assigned to the base station 20, Furthermore, if there are other radio resources that are primarily assigned only to base stations outside co-channel interference distance, these radio resources can be included in the available set of resources for the specific mobile station 40. The risk for co-channel interference is low even if these resources not primarily assigned to the own base station 20 are used.

The base station 20 further comprises allocation means 24, which is responsible for the actual allocation of radio resources for communication between the mobile station 40 and the base station 20. In this embodiment, radio resources selected from the available set of radio resources are allocated for downlink communication 54. The allocation is performed to give the mobile station 40 an appropriate quality-of-service in competition with other mobile stations connected to the same base station 40. Each of the connected mobile stations may then have their own available set of resources. By utilising allowed resources that are not primarily assigned to the base station 20 to mobile stations having a favourable interference situation, the resources primarily assigned to the base station 20 can be saved for any mobile stations being more exposed to co-channel interference. A higher utilisation degree of the total radio resource can thus be achieved.

Figure 4B:
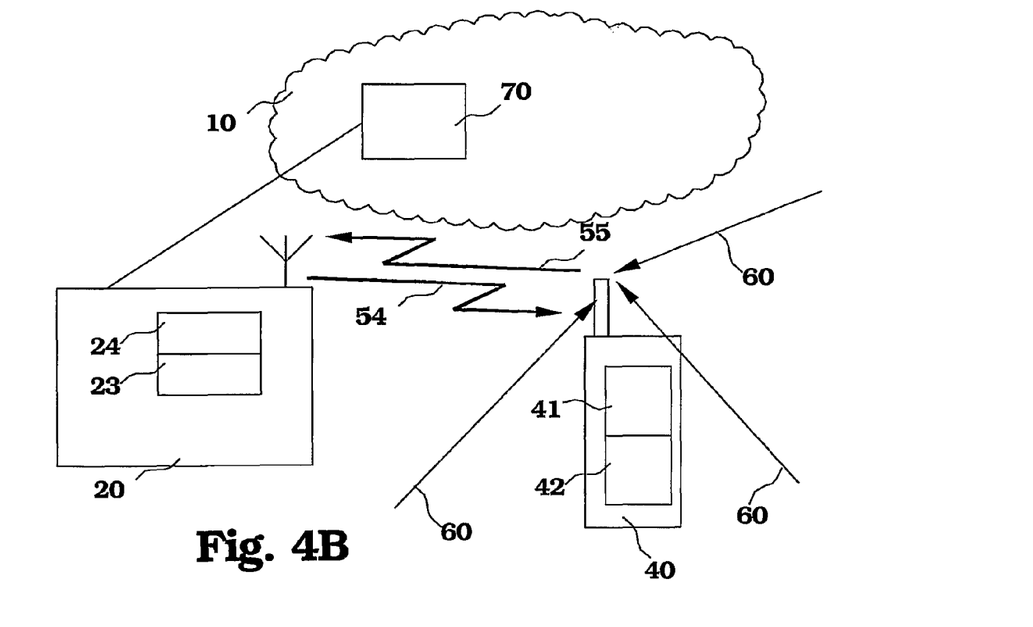
FIG. 4B is a block diagram of other non-limiting embodiments of a base station and a mobile station.

FIG. 4B illustrates another embodiment of a communications system. Similar parts as in FIG. 4A are denoted by the same reference numbers and are not in general discussed any further. In the present embodiment, the mobile station 40 comprises the measuring means 41. However, in this embodiment, the mobile station 40 also comprises an evaluation means 42, which by its functionality resembles the corresponding evaluation means of the base station in previous embodiment. The base station 20 can provide the mobile station 40 with information about relative emission powers between data and pilot signals. Such information can be provided not only for the own base station, but also for base stations that are believed to be within hearing (radio) distance. A message 55 is sent from the mobile station 40 to the base station 20, which message 55 now comprises information about which neighbouring base stations that are experienced as interfering. This information is used in the selection means 23 for obtaining the available set of radio resources for the mobile station 40.

If the mobile station 40 also is provided with information about the primary assignment of radio resources, also the functionalities performed by the selection means 23 can be performed at the mobile station 40 instead, and in such a case, the mobile station 40 may even suggest which radio resources to use for the subsequent communication.

The different functionalities can be performed at different parts of the communications system. That is, a device for performing a procedure according to one or more embodiments can be a distributed means. The measurement of the base station signals is performed at the mobile station. However, the remaining steps can be performed where it is appropriate for each implementation.

Figure 4C:
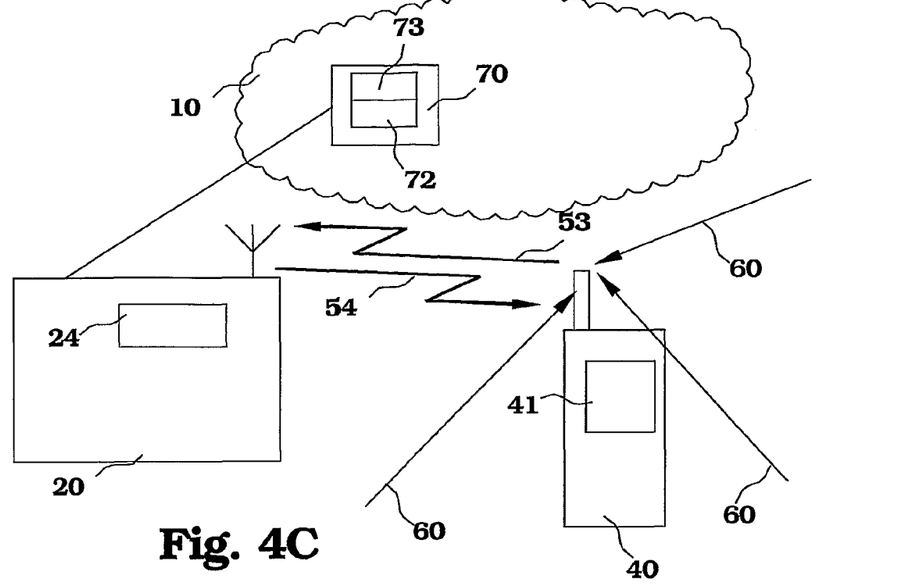
FIG. 4C is a block diagram of non-limiting embodiments of a core network, a base station and a mobile station.

FIG. 4C illustrates another embodiment of a communications system. In this embodiment, the measurements are performed at the mobile station 40 and a measurement report 53 is provided to the base station 20. However, in this embodiment, the base station 20 forwards the information to a node 70 in the core network 10. The node 70 then comprises evaluation means 72 and selection means 73 in analogy with earlier embodiments. The available set of radio resources is then communicated back to the base station 20 as a basis for the final allocation of the downlink traffic.

Figure 4D:
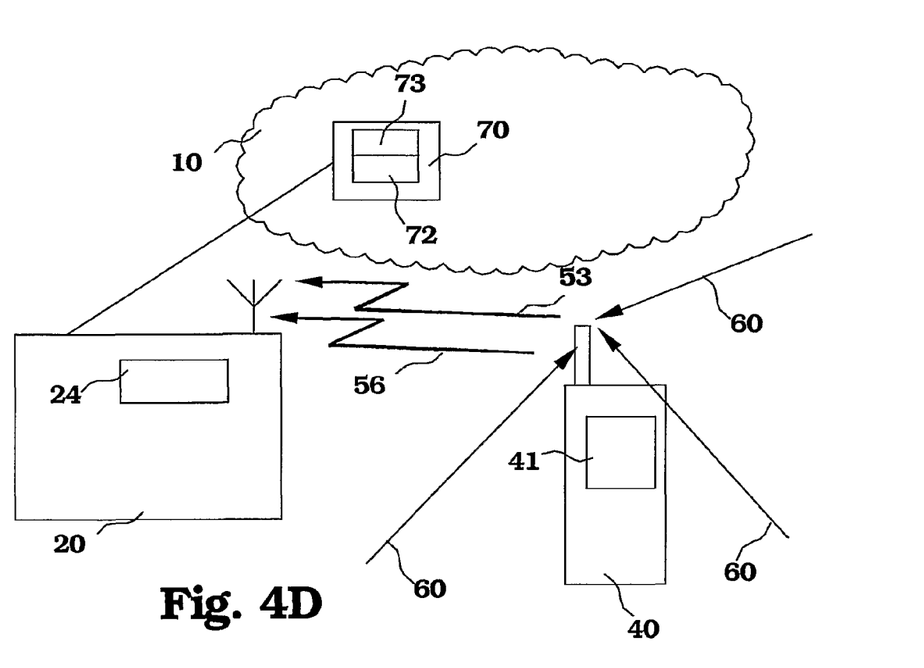
FIG. 4D is a block diagram of other non-limiting embodiments of a core network, a base station and a mobile station.

FIG. 4D is to most parts identical to FIG. 4C, but the available set of radio resources now comprises resources intended for uplink communication 56. The mobile station 40 measures the signals from the neighbouring base stations as before and sends a measurement report to the base stations 20, which forwards the information to a node 70 in the core network 10. The basic idea when allocating uplink traffic is that a mobile station that does not experience interference from other base stations is less likely to create interference with the same base stations. The node 70 may e.g. perform an actual C/I estimation and using C/I measures over a certain threshold as indications of presumed co-channel interference. The node 70 may preferably also use additional geographical knowledge about the communications system to refine the evaluation of the interference situation. Other complementary information may be activity indicators from neighbouring cells.

When selecting the available set of radio resources, the node 70 may also set a maximum emission power that is allowed to be used for each resource. Such power limitations can then be taken into account when allocating resources for the uplink communication 56.

Allocation of uplink resources and downlink resources can preferably be combined.

Figure 5:
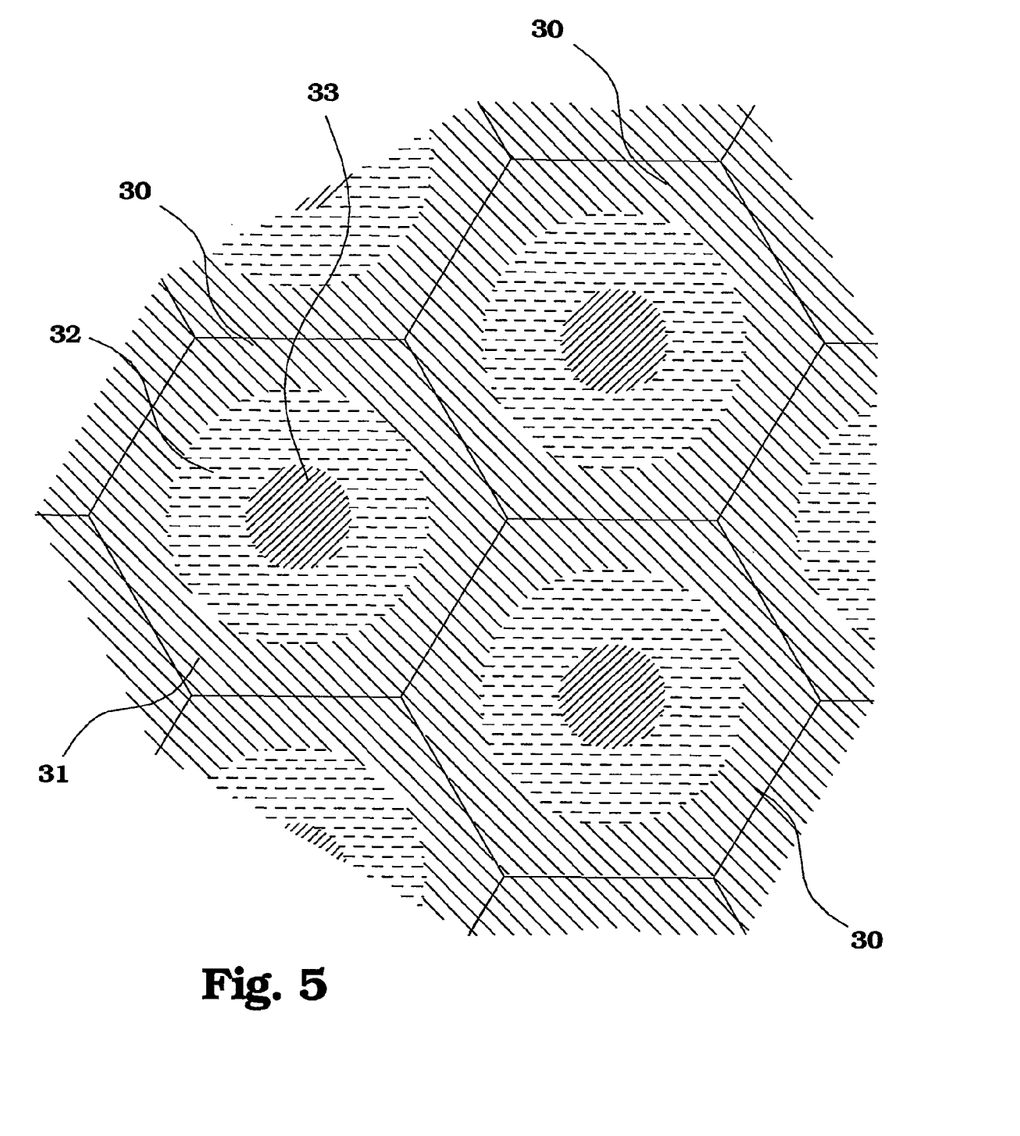
FIG. 5 is a visualization of a non-limiting reuse concept.

In a conventional cellular communications system, the concept of "reuse" is often used. The reuse is then defined with a cell basis, i.e, each cell is assigned a certain part of the radio resources. One or more embodiments expand upon and even significantly modify the conventional reuse concept, since each individual mobile station may have its own set of allowable radio resources. FIG. 5 illustrates this condition. The figure illustrates a number of cells 30 as hexagons. In the outer part 31, in a radio sense, of each cell 30, a certain portion of radio resources can be utilised. Since the risk for interference from neighbouring cells is large, a "reuse" factor larger than 1 is typically used. In an inner part 33, in a radio sense, of each cell 30, the interference risk is much lower, and basically all radio resources can be utilised. This corresponds to a reuse factor of 1. In an intermediate part 32, in a radio sense, of each cell 30, the risk for interference with certain base stations is large, while it still is small for other base stations. This means that some additional resources are available, as compared with the outer part 31. However, compared with the inner part 33, there is a restriction in the allowed radio resources. There is of course a smooth transition between these different stages, and the locations may vary from one cell to another or for one mobile station to another.

Figure 6:
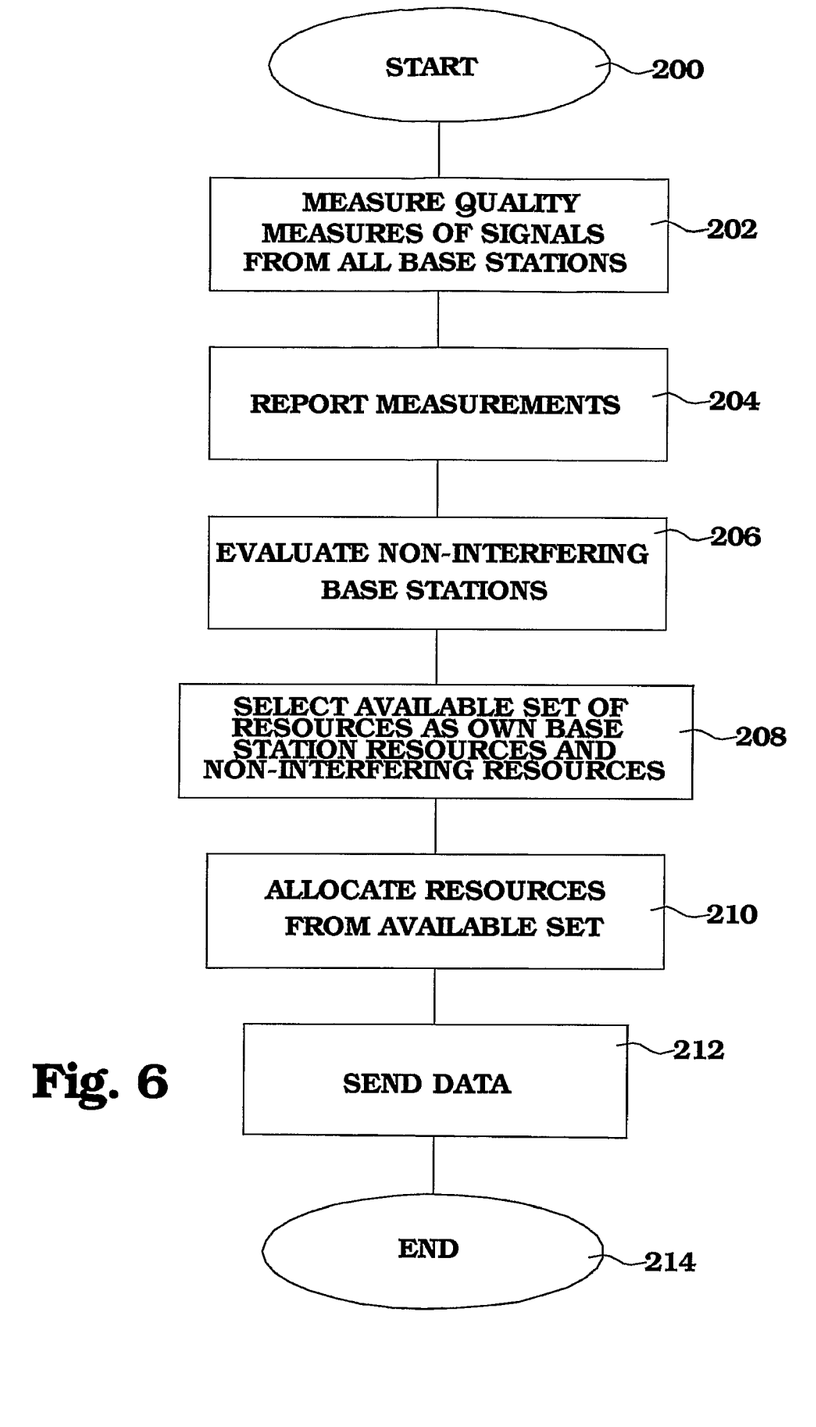
FIG. 6 is a flow diagram a non-limiting method.

FIG. 6 illustrates a flow diagram of basic steps of an example method. This method corresponds basically to the system illustrated in FIG. 4A. The procedure starts in step 200. In step 202, quality measures of signals from all base stations within hearable distance are measured at a mobile station. In step 204, the measurements are reported to a base station. In step 206, it is evaluated which base stations are within or outside interfering radio distance with the mobile station. Based on the result of step 206, an available set of resources is selected in step 208. This selection comprises resources primarily assigned to the own base stations as well as resources assigned only to non-interfering base stations. In step 210, resources from the available set of resources are allocated for communication between the mobile station and the base stations. The data is then sent using the allocated resources in step 212. The procedure ends in step 214.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

U.S. Pat. No. 6,498,934
US 2003/0013451 A1

The invention claimed is:

1. A method for dynamic allocation of radio resources of a radio communications, said method comprising:
   measuring, at a first mobile station connected to a first base station of the radio communication system, quality measures of signals transmitted from a multitude of base stations of the radio communication system;
   evaluating, in a first node, which base station or stations of the multitude of base stations would give rise to an unacceptable co-channel interference at the first mobile station for communication with the first base station, based on the measured quality measures;
   selecting, in a second node, available radio resources for communication in a first direction between the first base station and the first mobile station, based on results of the evaluating step
   allocating, from the first base station, at least one radio resource from the available radio resources for the communication in the first direction between the first base station and the first mobile station,
   said allocating comprises:
   dividing the radio resources of the radio communication system into a plurality of sets of radio resources such that each set has no radio resource in common with any other set,
   assigning each base station of said radio communication system at least one set of said plurality of sets as its primary assigned radio resources such that each primary assigned radio resources of said each base station is different from one another in said communication system,
   said selecting comprises selecting radio resources that are not primary assigned to the first base station and are primary assigned to at least one base station found not to give rise to the unacceptable co-channel interference.

2. The method according to claim 1, wherein the signals on which the measurements are performed comprise pilot signals.

3. The method according to claim 1, wherein the signals on which the measurements are performed comprise user data signals.

4. The method according to claim 1, wherein the quality measures comprise path loss.

5. The method according to claim 1, wherein the quality measures comprise interference level measures.

6. The method according to claim 1, wherein the first direction is a downlink direction.

7. The method according to claim 1, wherein the first direction is an uplink direction.

8. The method according to claim 1, wherein the sets of primary assigned radio resources are defined by a radio resource reuse plan.

9. The method according to claim 1, wherein the first node performing the evaluating step is the first mobile station.

10. The method according to claim 1, further comprising:
    transferring data representing the quality measures from the first mobile station to the first base station,
    whereby the first node performing the evaluating step is a communications system node.

11. The method according to claim 10, wherein the communications system node is a node of a core network of the communications system.

12. The method according to claim 1, wherein the step of allocating is performed at a packet basis.

13. An arrangement for dynamic allocation of radio resources of a radio communications system, said arrangement comprising:
means for receiving, from a first mobile station connected to a first base station of the radio communication system, data representing quality measures of signals transmitted from multitude of base stations of the radio communication system measured at the first mobile station;
means for evaluating which base station or stations of the multitude of base stations would give rise to an unacceptable co-channel interference for communication with the first base station, based on the measured quality measures;
means for selecting available radio resources for communication in a first direction between the first base station and the first mobile station based on results provided by the means for evaluating; and
means for allocating at least one radio resource resources from the available radio resources for the communication in the first direction between the first base station and the first mobile station,
said means for allocating further
dividing the radio resources of the radio communication system into a plurality of sets of radio resources such that each set has no radio resource in common with any other set,
assigning each base station of said radio communication system at least one set of said plurality of sets as its primary assigned radio resources such that each primary assigned radio resources of said each base station is different from one another in said communication system,
said means for selecting further selecting radio resources that are not primary assigned to the first base station and are primary assigned to at least one base station found not to give rise to the unacceptable co-channel interference.

14. The arrangement according the claim 13, wherein at least a part of the arrangement is comprised in the first mobile station.

15. The arrangement according to claim 13, wherein at least a part of the arrangement is comprised in a node of the communication system.

16. The arrangement according the claim 15, wherein the node is a base station.

17. The arrangement according to claim 13, wherein the arrangement is distributed on more than one node of the communications system.

18. A communication system, comprising;
at least one arrangement comprising a multitude of base stations communicating with mobile stations using radio resources of the communication system,
means for dividing the radio resources of the radio communication system into a plurality of sets of radio resources such that each set has no radio resource in common with any other set,
means for assigning each base station of said radio communication system at least one set of said plurality of sets as its primary assigned radio resources such that each primary assigned radio resources of said each base station is different from one another in said communication system,
said arrangement comprises:
means for receiving, from a first mobile station connected to a first base station of the arrangement, data representing quality measures of signals transmitted from the multitude of base stations measured at the first mobile station;
means for evaluating which base station or stations of the multitude of base stations that would give rise to an unacceptable co-channel interference for communication with the first base station based on the measured quality measures;
means for selecting available radio resources for communication in a first direction between the first base station and the first mobile station based on results provided by the means for evaluating, the selected available radio resources including radio resources that are not primary assigned to the first base station and are primary assigned to at least one other base station of the multitude of base stations found not to give rise to the unacceptable co-channel interference; and
means for allocating at least one radio resource from the available radio resources for the communication in the first direction between the first base station and the first mobile station.

19. The method according to claim 1, wherein in the step of selecting, the primary assigned resources of the first base station are always included in the available radio resources.

20. The arrangement according to claim 13, wherein in the means for selecting always includes the primary assigned resources of the first base station in the available radio resources.

21. The system according to claim 18, wherein in the means for selecting always includes the primary assigned resources of the first base station in the available radio resources.

22. The method according to claim 1, wherein when it is determined that no base station is found to give rise to the unacceptable co-channel interference in the evaluating step, an entirety of the radio resources of the radio communication system are selected as the ,available radio resources in the selecting step.

23. The arrangement according to claim 13, wherein when the means for evaluating determines that no base station is found to give rise to the unacceptable co-channel interference in the evaluating step, the means for selecting selects an entirety of the radio resources of the radio communication system as the available radio resources.

24. The system according to claim 18, wherein when the means for evaluating determines that no base station is found to give rise to the unacceptable co-channel interference in the evaluating step, the means for selecting selects an entirety of the radio resources of the radio communication system as the available radio resources.

* * * * *

UNITED STATES PATENT AND TRADEMARK OFFICE
CERTIFICATE OF CORRECTION

PATENT NO. : 7,912,475 B2  
APPLICATION NO. : 11/578515  
DATED : March 22, 2011  
INVENTOR(S) : Klang et al.

Page 1 of 1

It is certified that error appears in the above-identified patent and that said Letters Patent is hereby corrected as shown below:

In Column 3, Line 29, delete "a" and insert -- of a --, therefor.

In Column 5, Lines 18-29, delete "According............downlink situations."

In Column 7, Line 63, delete "20," and insert -- 20. --, therefor.

In Column 11, Line 23, in Claim 13, delete "resource resources" and insert -- resource --, therefor.

In Column 11, Line 43, in Claim 14, delete "according the" and insert -- according to --, therefor.

In Column 11, Line 49, in Claim 16, delete "according the" and insert -- according to --, therefor.

In Column 11, Line 54, in Claim 18, delete "comprising;" and insert -- comprising: --, therefor.

In Column 12, Line 46, in Claim 22, delete "the ,available" and insert -- the available --, therefor.

Signed and Sealed this  
Eighth Day of November, 2011

David J. Kappos  
*Director of the United States Patent and Trademark Office*